United States Patent [19]
Womack

[11] Patent Number: 5,197,348
[45] Date of Patent: Mar. 30, 1993

[54] SERPENTINE TUBE INSPECTION POSITIONING SPINE

[75] Inventor: Robert E. Womack, Forest, Va.

[73] Assignee: The Babcock & Wilcox Company, New Orleans, La.

[21] Appl. No.: 773,425

[22] Filed: Oct. 7, 1991

[51] Int. Cl.$^5$ .............................................. F16C 1/28
[52] U.S. Cl. .................................. 74/502.3; 74/502.5
[58] Field of Search ......................... 74/502.3, 502.5; 901/14

[56] References Cited

U.S. PATENT DOCUMENTS

| | | | |
|---|---|---|---|
| 1,662,093 | 3/1928 | Wells et al. | 74/502.3 |
| 1,930,272 | 10/1933 | Huck | 74/502.3 |
| 2,926,537 | 3/1960 | Pieterse | 74/502.3 X |

FOREIGN PATENT DOCUMENTS

| | | | |
|---|---|---|---|
| 1079598 | 5/1954 | France | 74/502.3 |
| 12705 | of 1888 | United Kingdom | 74/502.3 |
| 1056695 | 6/1964 | United Kingdom | 74/502.3 |

Primary Examiner—Rodney H. Bonck
Assistant Examiner—Ryan W. Massey
Attorney, Agent, or Firm—Robert J. Edwards; D. Neil LaHaye

[57] ABSTRACT

A positioning spine for driving equipment used in inspecting tubing. A helical extension spring has a plurality of wheeled carriers mounted thereon at selected intervals. Wheels mounted on each carrier rotate in planes radial to the spring to allow the positioning spine to travel through tubes having bends in more than one plane. Each carrier is formed from two body sections that are fastened together around the spring.

7 Claims, 2 Drawing Sheets

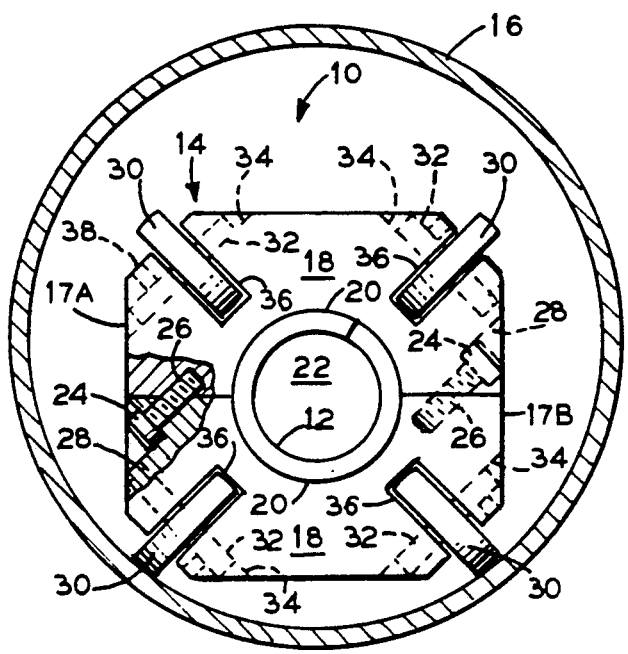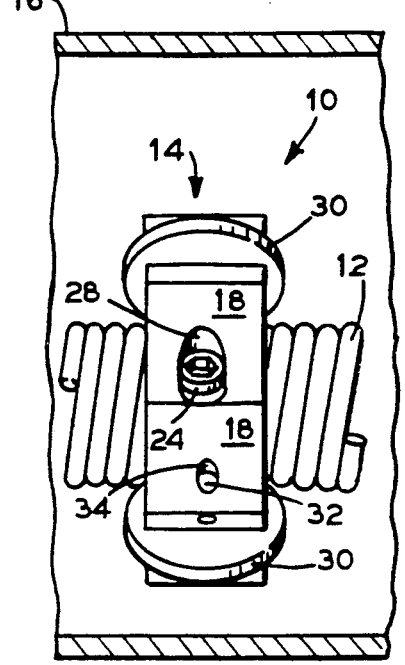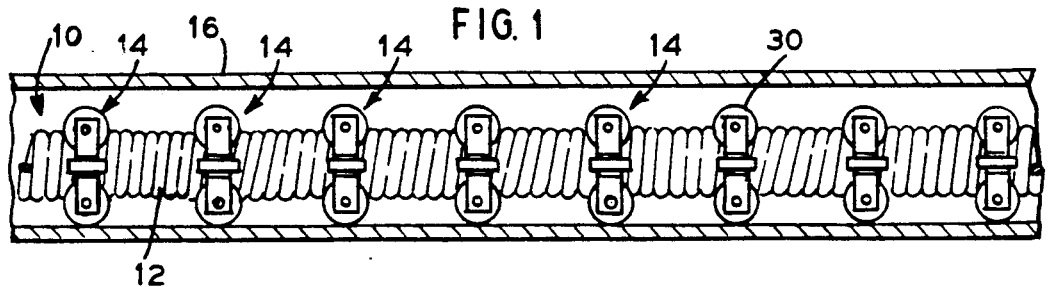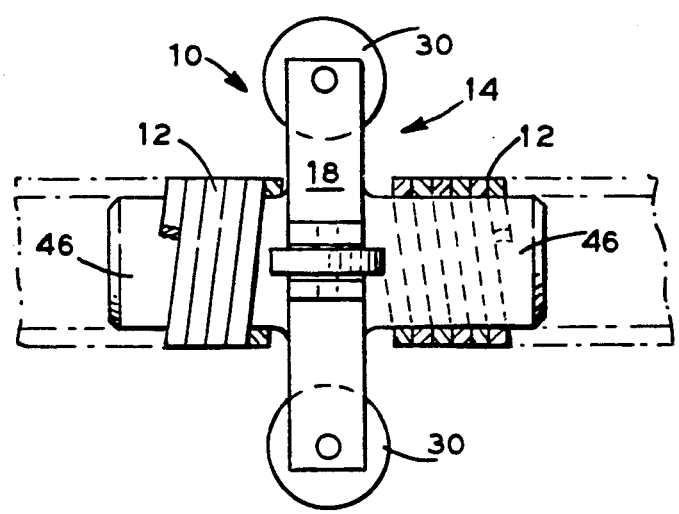

SERPENTINE TUBE INSPECTION POSITIONING SPINE

BACKGROUND OF THE INVENTION

1. Field of the Invention

The present invention is generally related to non-destructive inspection of pipes and tubing and in particular to positioning of inspection devices at various locations along the interior of serpentine-bent tube sections.

2. General Background

Many boilers have serpentine-bent horizontal tube sections. Such tube sections are generally of a 1 to 2 inch inner diameter with multiple (as many as 20) tight radius 180 degree bends and may be several hundred feet long. Non-destructive testing of the interior of the tubing is accomplished by the use of transducers. The type of mechanism used to move a transducer through a tube is chosen depending on tube diameter, the number, direction, extent, and radius of bends, and the length of the tube to be inspected. Moderately short lengths of tubing with few and gradual bends often depend upon a flexible cable similar to a plumber's "snake" for movement of an inspection transducer. Such devices are not known to be applicable to boiler tubes as described above. "Tractor" devices capable of negotiating the sharp bends and pulling a transducer and its signal cable along are also not known. Flexible cables pushed from the end of the tube are impractical beyond the first or second bend in the tubing due to the build up of drag forces. Various devices of which the inventor is aware include the following.

U.S. Pat. No. 3,583,393, No. 3,497,083, and No. 4,238,973 disclose selectively bendable tube assemblies and manipulators.

U.S. Pat. No. 2,748,803 and No. 4,648,733 disclose a reinforced hose and installation template for conduits.

U.S. Pat. No. 3,623,756 and No. 3,918,821 disclose articulated connectors.

U.S. Pat. No. 4,290,762, No. 3,020,362 and No. 3,197,954 disclose various link chains.

German patent no. 494,160 discloses a flexible shaft.

French patent no. 1,079,598 discloses a mechanical remote control that uses cables and springs inside a rigid conduit.

U.S. Pat. No. 4,896,555 discloses an inspection spine formed from identical links mated together by a pivot pin at bifurcated ends. Flat alignment faces are provided to prevent buckling during insertion. An oval bore for the pivot pin in one link allows pivoting of links at tubing bends.

Although there are a variety of flexible connectors available, there are few that fit the need to be able to travel through serpentine tube sections as described above where the device must be capable of being pushed through the tubes and then pulled back out once inspection is completed. Also, since there are a variety of tubes and tube configurations, such as tubes that have bends in more than one plane, no one system will serve all applications equally well.

The problems encountered are as follows. During insertion, when the device is being pushed through the tube, compression forces result in the links having a tendency to buckle at the link connecting pivot points, causing lock-up in straight sections of the tube and generating side loads that quickly become unacceptably high. Major drag forces are also generated in the bend areas of the tube during insertion and removal of known devices.

SUMMARY OF THE INVENTION

The present invention addresses the aforementioned need in a straightforward manner. What is provided is a positioning spine formed from an extension spring having a plurality of wheeled carriers mounted thereon at selected intervals. Wheels mounted on each carrier allow rolling movement of the spring through the tubing with a minimum of friction. The extension spring provides resilience in the direction of the central axis and restoring forces against side deflections normal to that axis. This mechanism provides alignment of the links to form a straight column capable of maintaining its alignment under compressive loads without buckling. The column is also flexible enough to follow the curvature of tubing bends and still resume the straight column configuration automatically after passing through the bend.

BRIEF DESCRIPTION OF THE DRAWINGS

For a further understanding of the nature and objects of the present invention reference should be had to the following description taken in conjunction with the accompanying drawings in which like parts are given like reference numerals and, wherein:

FIG. 1 is a plan view of the invention.

FIG. 2 is a plan view of the invention rotated 45 degrees from that of FIG. 1

FIG. 3 is a partial cutaway end view of the invention in a tube.

FIG. 4 is a plan view of an alternate embodiment of the invention.

DETAILED DESCRIPTION OF THE PREFERRED EMBODIMENT

Figure 5:
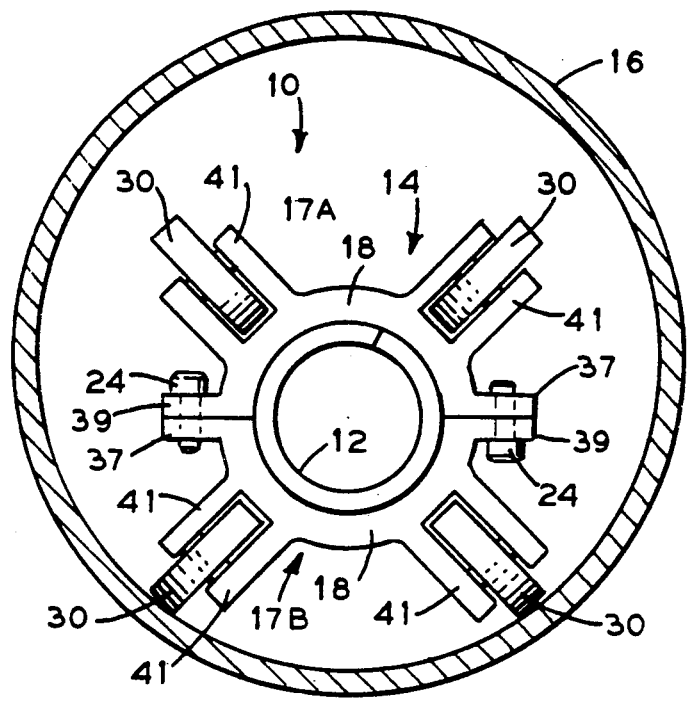
FIG. 5 is an end view of the embodiment of FIG. 4

Referring to the drawings, it is seen in FIGS. 1-3 that the invention is generally indicated by the numeral 10. Positioning spine 10 is generally comprised of helical extension spring 12 and a plurality of wheeled carriers 14. FIGS. 1-3 illustrate positioning spine 10 as it appears inside tube 16 that is to be inspected.

In the preferred embodiment, helical extension spring 12 is formed from spring stock material having a rectangular cross section as seen in FIG. 4. The longer axis of the rectangle is preferably in the radial direction of spring 12. The rectangular cross section provides lateral support beyond that of the normal lateral stiffness of spring 12. During compressive loads, when positioning spine 10 is being inserted into tube 16 to be inspected, the additional lateral support helps to prevent buckling of spring 12. As an alternate embodiment, spring 12 may be formed from spring stock material having the more common round cross section as best seen in FIG. 2. The size and stiffness of spring 12 to be used are determined according to the diameter and length of tube 16 to be inspected and the number of bends in tube 16 that positioning spine 10 must pass through. Springs are normally classified according to axial deflection spring rates. However, in positioning spine 10, it is the related but not equal lateral stiffness of spring 12 that is more important. The proper lateral stiffness insures that spring 12 does not buckle under compressive loads and causes it to straighten after passing through a bend in tube 16.

A plurality of wheeled carriers 14 are attached to spring 12 at selected intervals that serve to complement the normal lateral stiffness of spring 12. As seen in FIG. 3, each wheeled carrier 14 is formed from two identical body sections 17A,B fastened together. Each body section 17A,B has a main body portion 18. Each main body portion 18 is provided with a semicircular cutout 20. Axial bore 22 is formed in wheeled carrier 14 when two the body sections 17A,B are fastened together with semicircular cutouts 20 facing each other. The two body sections 17A,B are rigidly fastened together around helical extension spring 12 by means of screws 24. Threaded bore 26 is provided in one side of main body portion 18 and extends into main body portion 18 at an angle on the surface that mates with a second body section 17. Unthreaded bore 28 extends through a side wall of main body portion 18 to the surface that mates with a second body section. Bores 26, 28 are positioned so as to be in coaxial alignment when the two body sections 17A,B are placed together as seen in FIG. 3. Screws 24 are then readily received to securely fasten two body sections 17A,B together.

In the preferred embodiment, four wheels 30 are provided on wheeled carrier 14. One wheel is rotatably mounted on axle 32 at each corner of wheeled carrier 14. Axle 32 is received in bore 34 that extends through the corner of main body portion 18 at approximately a 45 degree angle to the two surfaces that form the corner. Wheel 30 is rotatably mounted on axle 32 and received in a recess 36 in main body portion 18. Axle 32 may be secured in position by any suitable means such as by being pressed in or by set screw 38. Wheels 30 rotate in planes radial to helical extension spring 12 to allow positioning spine 10 to travel through tubes having bends in more than one plane.

Figure 6:
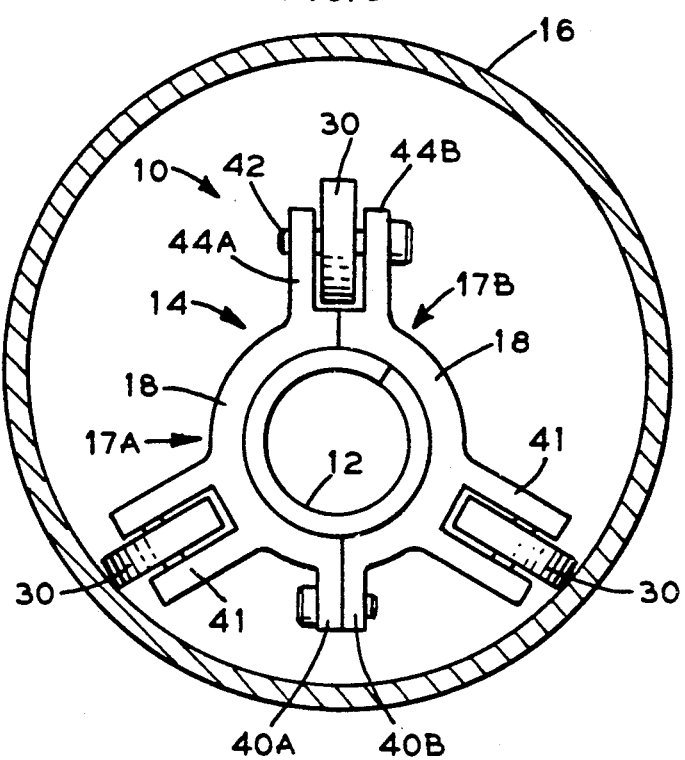
FIG. 6 is an end view of another alternate embodiment of the invention.

FIGS. 4–6 illustrate alternate embodiments of the invention. FIG. 5 illustrates an alternate embodiment where main body portions 18 provide a substantially circular cross section as opposed to the square cross section of the preferred embodiment. Flanges 37, 39 are respectively provided with threaded and unthreaded bores for receiving screws 24 to fasten two body sections 17A,B together to form wheeled carrier 14. Four wheels 30 are provided on U-shaped extensions 41 in a similar fashion to that of FIG. 1 to allow travel through tubes having bends in more than one plane.

FIG. 6 illustrates an alternate embodiment of the invention where three wheels 30 are equally spaced around the periphery of wheeled carrier 14. In this embodiment a threaded bore is provided in flange 40B of body section 17B and an unthreaded bore is provided in the corresponding flange 40B of the second body section 17B. On the opposite side of wheeled carrier 14 from flanges 40A,B, an axle 42 that also serves as a screw means for fastening the two body sections 17 together may be used. Axle 42 is provided with a threaded end that is threadably received in a bore in extension 44A. Extension 44B on adjoining body section 17B is provided with a bore that is coaxial with the threaded bore in extension 44A when body sections 17A,B are positioned for attachment together. The other two wheels 30 are rotatably mounted on axles in U-shaped extensions 41 on body sections 17A,B. As in the preferred embodiment, wheels 30 rotate in planes radial to helical extension spring 12 to allow positioning spine 10 to travel through tubes having bends in more than one plane.

FIG. 4 illustrates an alternate embodiment of the invention where the body of wheeled carrier 14 is formed from a single piece. Main body portion 18 is provided with cylindrical portions 46 that extend axially from either side of main body portion 18. In this embodiment, a plurality of helical extension springs 12 shorter than that in the preferred embodiment each have one end received on cylindrical portion 46 of one of wheeled carriers 14 and a second end received on cylindrical portion 46 of another wheeled carrier 14. Cylindrical portions 46 have an outer diameter sized to fit tightly within helical extension spring 12. The fit may be tailored such that spring 12 is screwed onto cylindrical portion 46. Any suitable adhesive may also be used to help insure that springs 12 do not separate from wheeled carriers 14 during use of positioning spine 10. As in the preferred embodiment, spring stock material having a rectangular cross section is preferred but spring stock material having a round cross section may also be used.

In operation, body sections 17A,B are securely fastened together around helical extension spring 12 as seen in FIGS. 2 and 3 to form wheeled carrier 14. A plurality of wheeled carriers 14 are attached to helical extension spring 12 at selected intervals. The space formed inside spring 12 is used to accommodate wiring that is run to an inspection device at one end of spring 12. This forms positioning spine 10 which is used to move an inspection device known in the art through tube 16. The positioning of wheels 30 allows positioning spine 10 to travel through bends in more than one plane. The alternate embodiments of FIGS. 5 and 6 are used in the same manner. In the alternate embodiment of FIG. 4, wheeled carrier 14 has a single-piece main body portion 18. A plurality of these wheeled carriers are attached between shorter lengths of helical extension springs 12 to form positioning spine 10.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:
1. A positioning spine, comprising:
  a. a helical extension spring;
  b. a plurality of wheeled carriers attached to said spring at selected intervals, each of said wheeled carriers having wheels rotatably mounted thereon that rotate in planes radial to said spring; and
  c. each of said wheeled carriers formed from two body sections having a semicircular cutout sized to fit around said spring and being fastened together around said spring.
2. The positioning spine of claim 1, wherein each of said wheeled carriers is provided with four wheels.
3. The positioning spine of claim 1, wherein each of said wheeled carriers is provided with three wheels.
4. A positioning spine, comprising:
  a. a plurality of identical wheeled carriers, each of said wheeled carriers having a cylindrical portion that extends axially from either side thereof;
  b. a plurality of helical extension springs, each of said springs having one end received on the cylindrical portion of one of said wheeled carriers and a sec- ond end received on the cylindrical portion of another of said wheeled carriers; and c. said wheeled carriers each having wheels rotatably mounted thereon that rotates in planes radial to said springs.

5. The positioning spine of claim 4, wherein each of said wheeled carriers is provided with four wheels.

6. The positioning spine of claim 4, wherein each of said wheeled carriers is provided with three wheels.

7. The positioning spine of claim 4, wherein each of said helical extension springs is formed from spring stock having a rectangular cross section.

* * * * *